(12) United States Patent
Yang et al.

(10) Patent No.: US 9,172,452 B2
(45) Date of Patent: Oct. 27, 2015

(54) METHOD FOR ACQUIRING SIGNAL TO NOISE RATIO, SIGNAL RECEIVING DEVICE AND SIGNAL SENDING DEVICE

(71) Applicant: Huawei Technologies Co., Ltd., Shenzhen, Guangdong (CN)

(72) Inventors: Jianbing Yang, Shenzhen (CN); Zuomin Wu, Beijing (CN); Xinwei Zhi, Kista (SE); Xingqing Cheng, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/532,701

(22) Filed: Nov. 4, 2014

(65) Prior Publication Data

US 2015/0055693 A1 Feb. 26, 2015

Related U.S. Application Data

(63) Continuation of application No. PCT/CN2012/075101, filed on May 4, 2012.

(51) Int. Cl.
| | |
|---|---|
| *H04B 17/00* | (2015.01) |
| *H04B 7/06* | (2006.01) |
| *H04W 24/06* | (2009.01) |
| *H04L 25/08* | (2006.01) |
| *H04W 24/08* | (2009.01) |
| *H04W 48/16* | (2009.01) |

(52) U.S. Cl.
CPC .............. *H04B 7/0632* (2013.01); *H04B 7/06* (2013.01); *H04L 25/08* (2013.01); *H04W 24/06* (2013.01); *H04W 24/08* (2013.01); *H04W 48/16* (2013.01)

(58) Field of Classification Search
CPC .... H04B 10/07; H04B 10/075; H04B 10/077; H04B 10/0795; H04B 10/07953; H04B 10/07955
USPC ......... 375/259, 260, 267, 295, 296, 316, 346, 375/347, 348, 349
See application file for complete search history.

(56) References Cited

U.S. PATENT DOCUMENTS

| | | | | |
|---|---|---|---|---|
| 6,456,653 | B1* | 9/2002 | Sayeed | 375/227 |
| 6,611,794 | B1* | 8/2003 | Fleming-Dahl | 702/191 |
| 2006/0034244 | A1 | 2/2006 | Huang et al. | |
| 2007/0140363 | A1* | 6/2007 | Horng et al. | 375/260 |
| 2010/0329379 | A1* | 12/2010 | Pham et al. | 375/267 |
| 2012/0020230 | A1 | 1/2012 | Chen et al. | |

FOREIGN PATENT DOCUMENTS

| | | |
|---|---|---|
| CN | 101207600 A | 6/2008 |
| CN | 102098114 A | 6/2011 |
| CN | 102413487 A | 4/2012 |

OTHER PUBLICATIONS

"3rd Generation Partnership Project; Technical Specification Group Radio Access Network; Evolved Universal Terrestrial Radio Access (E-UTRA); User Equipment (UE) radio transmission and reception (Release 11)", 3GPP TS 36.101 V11.0.0, Mar. 2012, 309 pages.

* cited by examiner

*Primary Examiner* — Siu Lee (57) ABSTRACT

Embodiments of the present invention provide a method for acquiring a signal to noise ratio (SNR), a signal receiving device and a signal sending device. Through the embodiments of the present invention, an SNR of the signal receiving device (i.e., a receiving end) can satisfy the setting requirement, that is, the test condition that an SNR does not contain a precoding gain, so that a subsequent test is valid.

12 Claims, 3 Drawing Sheets

In a condition that no precoding gain exists, receive a second noise signal and receive precoded second data sent by a sending end — 401

Obtain a third SNR according to signal receiving power of the received second data and according to second power of the received second noise signal — 402

METHOD FOR ACQUIRING SIGNAL TO NOISE RATIO, SIGNAL RECEIVING DEVICE AND SIGNAL SENDING DEVICE

CROSS-REFERENCE TO RELATED APPLICATIONS

This application is a continuation of International Application No. PCT/CN2012/075101, filed on May 4, 2012, which is hereby incorporated by reference in its entirety.

TECHNICAL FIELD

The present invention relates to test technologies, and in particular, to a method for acquiring a signal to noise ratio (Signal to Noise Ratio, SNR), a signal receiving device and a signal sending device.

BACKGROUND

In a relay backhaul link of a wireless communication system such as a long term evolution (Long Term Evolution, LTE) system or a long term evolution-advanced (Long Term Evolution Advanced, LTE-A) system, a device needs to be tested. During a test process, an SNR specified by the system is needed. In a signal test process, the SNR of a receiving end is set to a specified minimum index.

However, in a multi-output scenario, because a precoding technology is adopted in a signal sending device, the SNR measured by a signal receiving device (that is, the SNR of the receiving end) is an SNR containing a precoding gain, which does not satisfy the setting requirement, so that the test is invalid.

SUMMARY

Embodiments of the present invention provide a method for acquiring an SNR, a signal receiving device and a signal sending device, to satisfy the setting requirement that an SNR does not contain a precoding gain.

In an aspect, a method for acquiring an SNR is provided, which includes:

receiving a first noise signal on at least one first RE and receiving, on the at least one first RE, first data sent by a sending end, where the first data is data before precoding; and obtaining a first SNR according to signal receiving power of the first data received on the at least one first RE and according to first power of the first noise signal received on the at least one first RE.

In an aspect, a method for acquiring an SNR is provided, which includes:

sending first data to a receiving end on at least one first RE, where the first data is data before precoding, so that the receiving end obtains a first SNR according to signal receiving power of the first data received on the at least one first RE and according to first power of a first noise signal received on the at least one first RE.

In an aspect, a method for acquiring an SNR is provided, which includes:

in a condition that no precoding gain exists, receiving a second noise signal and receiving precoded second data sent by a sending end; and obtaining a third SNR according to signal receiving power of the received second data and according to second power of the received second noise signal.

In an aspect, a method for acquiring an SNR is provided, which includes:

in a condition that no precoding gain exists, sending precoded second data to a receiving end, so that the receiving end obtains a third SNR according to signal receiving power of the received second data and according to second power of a received second noise signal.

In another aspect, a signal receiving device is provided, which includes:

a receiver, configured to receive a first noise signal on at least one first RE and receive, on the at least one first RE, first data sent by a signal sending device, where the first data is data before precoding; and a processor, configured to obtain a first SNR according to signal receiving power of the first data received by the receiver on the at least one first RE and according to first power of the first noise signal received by the receiver on the at least one first RE.

In another aspect, a signal sending device is provided, which includes:

a sender, configured to send first data, on at least one first RE, to a signal receiving device, where the first data is data before precoding, so that the signal receiving device obtains a first SNR according to signal receiving power of the first data received on the at least one first RE and according to first power of a first noise signal received on the at least one first RE.

In another aspect, a signal receiving device is provided, which includes:

a receiver, configured to: in a condition that no precoding gain exists, receive a second noise signal and receive precoded second data sent by a signal sending device; and a processor, configured to obtain a third SNR according to signal receiving power of the second data received by the receiver and according to second power of the second noise signal received by the receiver.

In another aspect, a signal sending device is provided, which includes:

a sender, configured to: in a condition that no precoding gain exists, send precoded second data to a signal receiving device, so that the signal receiving device obtains a third SNR according to signal receiving power of the received second data and according to second power of a received second noise signal.

It may be seen from the foregoing technical solutions that, in the embodiments of the present invention, the SNR of the signal receiving device, that is, the receiving end can satisfy the setting requirement, that is, the test condition that an SNR does not contain a precoding gain, so that a subsequent test is valid.

BRIEF DESCRIPTION OF THE DRAWINGS

To describe the technical solutions in the embodiments of the present invention or in the prior art more clearly, the following briefly introduces the accompanying drawings needed for describing the embodiments. Apparently, the accompanying drawings in the following description show merely some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention more comprehensible, the following clearly describes the technical solutions in the embodiments of the present invention with reference to the accompanying drawings in the embodiments of the present invention. Apparently, the described embodiments are merely a part rather than all of the embodiments of the present invention. All other embodiments obtained by persons of ordinary skill in the art based on the embodiments of the present invention without creative efforts shall fall within the protection scope of the present invention.

Figure 1:
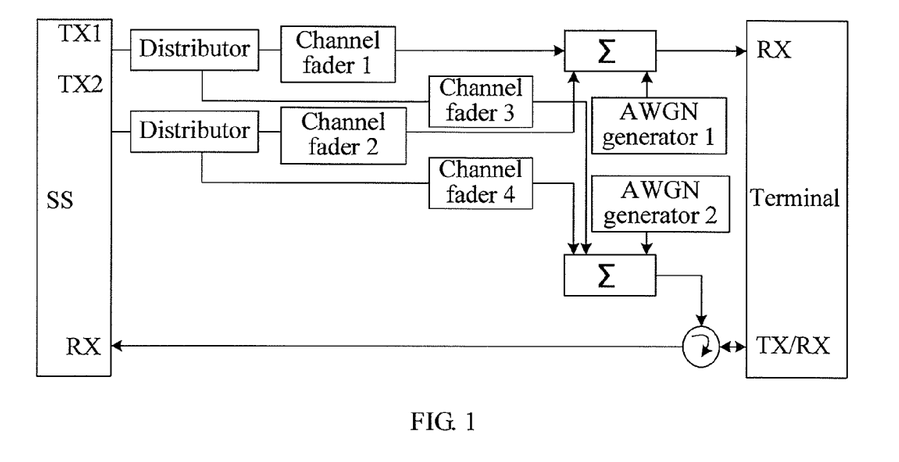
FIG. 1 is a schematic diagram of test connections in a downlink multi-output test scenario.

In a downlink multi-output test scenario, a sending end is, for example, 2T (T, transmit). As shown in FIG. 1, a system simulator (System Simulator, SS) includes two transmitting antennas, namely, TX1 and TX2. The two transmitting antennas each are connected to a terminal to be tested, that is, a receiving end through a signal fader (Fader), and the SS may be a base station simulator. Noises are provided for the receiving end through a noise generator, for example, an additive white Gaussion noise (Additive White Gaussion Noise, AWGN) generator. The base station simulator and the signal fader may be disposed separately. To save the cost, the base station simulator and the signal fader may also be packaged as a tester (Tester). Similarly, test connections in an uplink multi-output test scenario are similar to test connections in a downlink multi-output test scenario, and the details are not described here again.

The receiving end in the following embodiment may be user equipment, and the sending end in the following embodiment may be a base station simulator or a tester.

Figure 2:
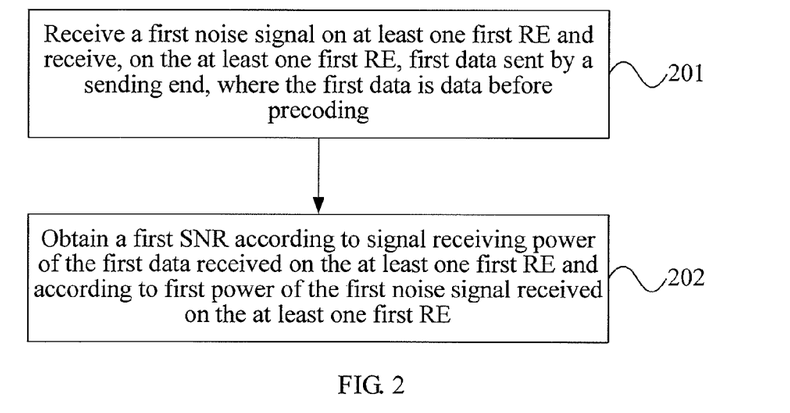
FIG. 2 is a schematic flow chart of a method for acquiring an SNR according to an embodiment of the present invention.

FIG. 2 is a schematic flow chart of a method for acquiring an SNR according to an embodiment of the present invention. Referring to FIG. 2, the method for acquiring an SNR of this embodiment may include:

201: Receive a first noise signal on at least one first resource element (Resource Element, RE) and receive, on the at least one first RE, first data sent by a sending end, where the first data is data before precoding.

Alternatively, in an optional implementation of this embodiment, a part of the REs of the sending end do not take part in scheduling, and these REs that do not take part in scheduling may be determined first. These REs are filled with irrelevant pseudo random data (that is, the first data) generated by an orthogonal frequency division multiple access (Orthogonal Frequency Division Multiple Access, OFDMA) channel noise generator (OFDMA Channel Noise Generator, OCNG), the modulation mode of the irrelevant pseudo random data is a quadrature phase shift keying (Quadrature Phase Shift Keying, QPSK) modulation mode, and the irrelevant pseudo random data does not need to be precoded.

202: Obtain a first SNR according to signal receiving power of the first data received on the at least one first RE and according to first power of the first noise signal received on the at least one first RE.

It should be noted that, the executor of 201 and 202 may be a receiving end.

Alternatively, in an optional implementation of this embodiment, after 202, the receiving end may further receive, on at least one second RE, the first data having a signal transmit power adjusted, and/or receive, on the at least one second RE, the first noise signal having a signal transmit power adjusted, and obtain a second SNR according to the following manner:

obtaining a second SNR according to signal receiving power of the first data that has the signal transmit power adjusted and is received on the at least one second RE and according to the first power of the first noise signal received on the at least one first RE; or, obtaining a second SNR according to signal receiving power of the first data that has the signal transmit power adjusted and is received on the at least one second RE and according to power of the first noise signal that has the signal transmit power adjusted and is received on the at least one second RE; or, obtaining a second SNR according to the signal receiving power of the first data received on the at least one first RE and according to power of the first noise signal that has the signal transmit power adjusted and is received on the at least one second RE.

The first power may include:

receiving power of the first noise signal received on the at least one first RE; or, transmit power of the first noise signal received on the at least one first RE.

The power of the first noise signal having the signal transmit power adjusted may include:

receiving power of the first noise signal received on the at least one second RE; or, transmit power of the first noise signal received on the at least one second RE.

Take a downlink multi-output test scenario as an example: a precoding gain in the SNR measured by the receiving end (that is, the SNR of the receiving end) is determined by a precoding matrix selected by the sending end according to a precoding matrix index (Precoding Matrix Index, precoding matrix index) that is fed back by the receiving end and matches with channel information. To ignore this part of the gain, the signal receiving power of the data and/or the power of the noise signal may be adjusted on REs (that is, the first RE and the second RE) before precoding on the sending end so as to set the SNR. This operation lasts for a while, and the receiving end starts to be tested after the SNR of the receiving end is stabilized.

In this embodiment, by receiving the first noise signal on the at least one first RE and receiving the first data sent by the sending end on the at least one first RE, where the first data is data before precoding; and obtaining the first SNR according to the signal receiving power of the first data received on the at least one first RE and according to the first power of the first noise signal received on the at least one first RE, the first SNR can satisfy the setting requirement, that is, the test condition that an SNR does not contain a precoding gain, so that a subsequent test is valid.

Figure 3:
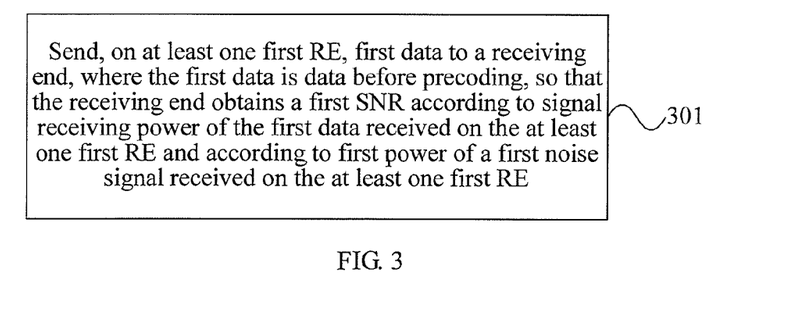
FIG. 3 is a schematic flow chart of a method for acquiring an SNR according to another embodiment of the present invention.

FIG. 3 is a schematic flow chart of a method for acquiring an SNR according to another embodiment of the present invention. Referring to FIG. 3, the method for acquiring an SNR of this embodiment may include:

301: Send, on at least one first RE, first data to a receiving end, where the first data is data before precoding, so that the receiving end obtains a first SNR according to signal receiving power of the first data received on the at least one first RE and according to first power of a first noise signal received on the at least one first RE.

It should be noted that, the executor of 301 may be a sending end.

Alternatively, in an optional implementation of this embodiment, a part of the REs of the sending end do not take part in scheduling, and these REs that do not take part in the scheduling may be determined first. These REs are filled with irrelevant pseudo random data (that is, the first data) generated by an orthogonal frequency division multiple access (Orthogonal Frequency Division Multiple Access, OFDMA) channel noise generator (OFDMA Channel Noise Generator, OCNG), the modulation mode of the irrelevant pseudo random data is a quadrature phase shift keying (Quadrature Phase Shift Keying, QPSK) modulation mode, and the irrelevant pseudo random data does not need to be precoded.

Alternatively, in an optional implementation of this embodiment, after 301, the sending end may further send, on at least one second RE, the first data having a signal transmit power adjusted, so that the receiving end obtains a second SNR according to the following manner:

obtaining a second SNR according to signal receiving power of the first data that has the signal transmit power adjusted and is received on the at least one second RE and according to the first power of the first noise signal received on the at least one first RE; or, obtaining a second SNR according to signal receiving power of the first data that has the signal transmit power adjusted and is received on the at least one second RE and according to power of the first noise signal that has a signal transmit power adjusted and is received on the at least one second RE; or, obtaining a second SNR according to the signal receiving power of the first data received on the at least one first RE and according to power of the first noise signal that has signal transmit power adjusted and is received on the at least one second RE.

The first power may include:
receiving power of the first noise signal sent on the at least one first RE; or,
transmit power of the first noise signal sent on the at least one first RE.

The power of the first noise signal having the signal transmit power adjusted may include:
receiving power of the first noise signal sent on the at least one second RE; or,
transmit power of the first noise signal sent on the at least one second RE.

Take a downlink multi-output test scenario as an example: a precoding gain in the SNR measured by the receiving end (that is, the SNR of the receiving end) is determined by a precoding matrix selected by the sending end according to a precoding matrix index (Precoding Matrix Index, PMI) that is fed back by the receiving end and matches with channel information. To ignore this part of the gain, the signal receiving power of the data and/or the power of the noise signal may be adjusted on REs (that is, the first RE and the second RE) before precoding on the sending end so as to set the SNR. This operation lasts for a while, and the receiving end starts to be tested after the SNR of the receiving end is stabilized.

In this embodiment, by sending the first data to the receiving end on the at least one first RE, where the first data is data before precoding, so that the receiving end obtains the first SNR according to the signal receiving power of the first data received on the at least one first RE and according to the first power of the first noise signal received on the at least one first RE, the first SNR can satisfy the setting requirement, that is, the test condition that an SNR does not contain a precoding gain, so that a subsequent test is valid.

Figure 4:
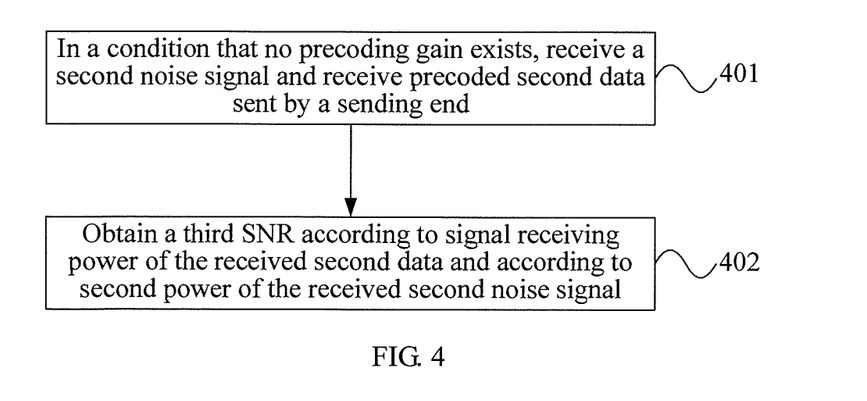
FIG. 4 is a schematic flow chart of a method for acquiring an SNR according to an embodiment of the present invention.

FIG. 4 is a schematic flow chart of a method for acquiring an SNR according to another embodiment of the present invention. Referring to FIG. 4, the method for acquiring an SNR of this embodiment may include:

401: In a condition that no precoding gain exists, receive a second noise signal and receive precoded second data sent by a sending end.

402: Obtain a third SNR according to signal receiving power of the received second data and according to second power of the received second noise signal.

It should be noted that, the executor of 401 and 402 may be a receiving end.

It should be noted that, the precoding gain in this embodiment may include:
a gain of the signal quality of the second data received through a first receiving method relative to the signal quality of the second data received through a second receiving method, where the first receiving method includes feeding back a first precoding matrix index to the sending end in a condition that a channel changes and receiving the precoded second data that is sent by the sending end after precoding the second data according to the first precoding matrix index, and the second receiving method includes directly receiving the second data sent by the sending end in a condition that a channel changes.

The second power of the second noise signal may include:
receiving power of the second noise signal; or,
transmit power of the second noise signal.

Alternatively, in an optional implementation of this embodiment, the condition that no precoding gain exists may include: a condition that the precoded second data is inconsistent with the change of a channel. Take a downlink multi-output test scenario as an example: a precoding gain in the SNR measured by the receiving end (that is, the SNR of the receiving end) is determined by a precoding matrix selected by the sending end according to a precoding matrix index that is fed back by the receiving end and matches with channel information. To ignore this part of the gain, the sending end and the receiving end may be controlled to implement data transmission irrelevant to the change of the channel, that is, the precoded second data is inconsistent with the change of the channel, so as to realize the condition that no precoding gain exists. Because the sending end and the receiving end implement data transmission irrelevant to the change of the channel, for example, no precoding gain exists between the sending end and the receiving end or the precoding gain there-between is 0, the SNR of the receiving end is regarded as an SNR that does not contain a precoding gain. This operation lasts for a while, and after the SNR of the receiving end is stabilized, the mode of the sending end may be set as a mode needed by the test, so as to test the receiving end.

Alternatively, in an optional implementation of this embodiment, 401 may specifically include: receiving the second noise signal and receiving the precoded second data that is sent by the sending end after precoding the second data according to a randomly adopted second precoding matrix index. Because the second precoding matrix index is randomly set, the precoding matrixes corresponding to some second precoding matrix indexes may bring a forward precoding gain to a channel, and the precoding matrixes corresponding to some second precoding matrix indexes may bring a backward precoding gain to a channel. This operation lasts for a while, and all the precoding gains brought by the precoding matrixes corresponding to the first PMI to the channel are 0, so that the SNR of the receiving end is an SNR that does not contain a precoding gain. After the SNR of the receiving end is stabilized, the mode of the sending end may be set as a mode needed by the test, so as to test the receiving end.

Alternatively, in an optional implementation of this embodiment, 401 may specifically include: receiving the second noise signal and receiving the precoded second data that is sent by the sending end and not processed by a signal fader. Because the data between the sending end and the receiving end (that is, the precoded second data) is not transmitted through a channel, that is, because no channel is used for data transmission, the power of the receiving end is consistent with the power of the sending end, thus the SNR of the receiving end is an SNR that does not contain a precoding gain. This operation lasts for a while, and after the SNR of the receiving end is stabilized, the mode of the sending end may be set as a mode needed by the test, so as to test the receiving end.

Alternatively, in an optional implementation of this embodiment, 401 may specifically include: receiving the second noise signal and receiving the second data that is sent by the sending end through a single-antenna transmitting mode. For example, an n×1 precoding matrix may be set, and the precoding matrix is a matrix having only one matrix element being 1 and the other matrix elements all being 0, where n is the number of transmitting antennas at the sending end. In the case of a 2T-configured SS, the precoding matrix of the sending end may be:

$$\begin{bmatrix} 1 \\ 0 \end{bmatrix}$$

Because the sending end adopts the single-antenna transmitting mode, the sending end does not perform precoding, thus the SNR of the receiving end is an SNR that does not contain a precoding gain. This operation lasts for a while, and after the SNR of the receiving end is stabilized, the mode of the sending end may be set as a mode needed by the test, so as to test the receiving end.

In an embodiment, the sending end may also adopt a single-antenna in-turn transmitting mode to complete the setting of the SNR. Alternatively, in an optional implementation of this embodiment, 401 may specifically include: receiving the second noise signal and receiving the second data that is sent by the sending end through a single-antenna in-turn transmitting mode, and the single-antenna in-turn transmitting mode includes: when the sending end is configured with n antennas, sending the second data through one antenna in the n antennas in turn, where the n is a positive integer. For example, the sending the second data through one antenna in the n antennas in turn when the sending end is configured with n antennas may specifically include the following condition:

when the sending end is configured with n antennas, setting n orthogonal precoding matrixes having a size of n×1, where the n precoding matrixes are matrixes having only one matrix element being 1 and the other matrix elements all being 0; and in a process of precoding the second data, using the n precoding matrixes to precode the second data in turn, and sending the precoded second data.

In the case of a 2T-configured SS, the precoding matrix of the sending end may be switched in the following collections:

$$\begin{bmatrix} 1 \\ 0 \end{bmatrix} \begin{bmatrix} 0 \\ 1 \end{bmatrix}$$

Further, in the case of a 4T-configured SS, the precoding matrix of the sending end may be switched in the following collections:

$$\begin{bmatrix} 1 \\ 0 \\ 0 \\ 0 \end{bmatrix} \begin{bmatrix} 0 \\ 1 \\ 0 \\ 0 \end{bmatrix} \begin{bmatrix} 0 \\ 0 \\ 1 \\ 0 \end{bmatrix} \begin{bmatrix} 0 \\ 0 \\ 0 \\ 1 \end{bmatrix}$$

Further, in the case of an 8T-configured SS, the precoding matrix of the sending end may be switched in the following collections:

$$\begin{bmatrix} 1 \\ 0 \\ 0 \\ 0 \\ 0 \\ 0 \\ 0 \\ 0 \end{bmatrix} \begin{bmatrix} 0 \\ 1 \\ 0 \\ 0 \\ 0 \\ 0 \\ 0 \\ 0 \end{bmatrix} \begin{bmatrix} 0 \\ 0 \\ 1 \\ 0 \\ 0 \\ 0 \\ 0 \\ 0 \end{bmatrix} \begin{bmatrix} 0 \\ 0 \\ 0 \\ 1 \\ 0 \\ 0 \\ 0 \\ 0 \end{bmatrix} \begin{bmatrix} 0 \\ 0 \\ 0 \\ 0 \\ 1 \\ 0 \\ 0 \\ 0 \end{bmatrix} \begin{bmatrix} 0 \\ 0 \\ 0 \\ 0 \\ 0 \\ 1 \\ 0 \\ 0 \end{bmatrix} \begin{bmatrix} 0 \\ 0 \\ 0 \\ 0 \\ 0 \\ 0 \\ 1 \\ 0 \end{bmatrix} \begin{bmatrix} 0 \\ 0 \\ 0 \\ 0 \\ 0 \\ 0 \\ 0 \\ 1 \end{bmatrix}$$

In this embodiment, in the condition that no precoding gain exists, by receiving the second noise signal and receiving the precoded second data sent by the sending end; and obtaining the third SNR according to the signal receiving power of the received second data and according to the second power of the received second noise signal, the SNR of the receiving end can satisfy the setting requirement, that is, the test condition that an SNR does not contain a precoding gain, so that a subsequent test is valid.

Figure 5:
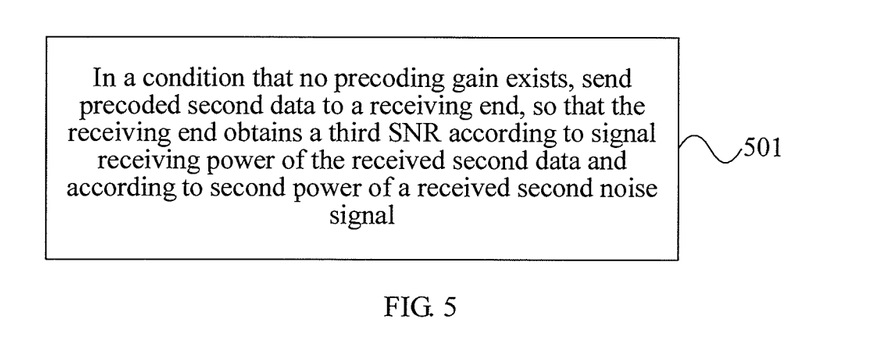
FIG. 5 is a schematic flow chart of a method for acquiring an SNR according to another embodiment of the present invention.

FIG. 5 is a schematic flow chart of a method for acquiring an SNR according to another embodiment of the present invention. Referring to FIG. 5, the method for acquiring an SNR of this embodiment may include:

501: In a condition that no precoding gain exists, send precoded second data to a receiving end, so that the receiving end obtains a third SNR according to signal receiving power of the received second data and according to second power of a received second noise signal.

Alternatively, the second data may be precoded first.

It should be noted that, the executor of 501 may be a sending end.

It should be noted that, the precoding gain in this embodiment may include:

a gain of the signal quality of the second data received by the receiving end through a first receiving method relative to the signal quality of the second data received by the receiving end through a second receiving method, where the first receiving method includes feeding back, by the receiving end, a first precoding matrix index to the sending end in a condition that a channel changes, and receiving the precoded second data that is sent by the sending end after precoding the second data according to the first precoding matrix index, and the second receiving method includes directly receiving, by the receiving end, the second data sent by the sending end in a condition that a channel changes.

The second power of the second noise signal may include:
receiving power of the second noise signal; or,
transmit power of the second noise signal.

Alternatively, in an optional implementation of this embodiment, the condition that no precoding gain exists may include: a condition that the precoded second data is inconsistent with the change of a channel. Take a downlink multi-output test scenario as an example: a precoding gain in the SNR measured by the receiving end (that is, the SNR of the receiving end) is determined by a precoding matrix selected by the sending end according to a precoding matrix index that is fed back by the receiving end and matches with channel information. To ignore this part of the gain, the sending end and the receiving end may be controlled to implement data transmission irrelevant to the change of the channel, that is, the precoded second data is inconsistent with the change of the channel, so as to realize the condition that no precoding gain exists. Because the sending end and the receiving end implement data transmission irrelevant to the change of the channel, for example, no precoding gain exists between the sending end and the receiving end or the precoding gain there-between is 0, the SNR of the receiving end is regarded as an SNR that does not contain a precoding gain. This operation lasts for a while, and after the SNR of the receiving end is stabilized, the mode of the sending end may be set as a mode needed by the test, so as to test the receiving end.

Alternatively, in an optional implementation of this embodiment, 501 may specifically include: sending the precoded second data to the receiving end after precoding the second data according to a randomly adopted second precoding matrix index. Because the second precoding matrix index is randomly set, the precoding matrixes corresponding to some second precoding matrix indexes may bring a forward precoding gain to a channel, and the precoding matrixes corresponding to some second precoding matrix indexes may bring a backward precoding gain to a channel. This operation lasts for a while, and all the precoding gains brought by the precoding matrixes corresponding to the first PMI to the channel are 0, so that the SNR of the receiving end is an SNR that does not contain a precoding gain. After the SNR of the receiving end is stabilized, the mode of the sending end may be set as a mode needed by the test, so as to test the receiving end.

Alternatively, in an optional implementation of this embodiment, 501 may specifically include: sending the precoded second data not processed by a signal fader to the receiving end. Because the data between the sending end and the receiving end (that is, the precoded second data) is not transmitted through a channel, that is, because no channel is used for data transmission, the power of the receiving end is consistent with the power of the sending end, so that the SNR of the receiving end is an SNR that does not contain a precoding gain. This operation lasts for a while, and after the SNR of the receiving end is stabilized, the mode of the sending end may be set as a mode needed by the test, so as to test the receiving end.

Alternatively, in an optional implementation of this embodiment, 501 may specifically include: sending the second data to the receiving end through a single-antenna transmitting mode. For example, an n×1 precoding matrix may be set, and the precoding matrix is a matrix having only one matrix element being 1 and the other matrix elements all being 0, where n is the number of transmitting antennas at the sending end. In the case of a 2T-configured SS, the precoding matrix of the sending end may be:

$$\begin{bmatrix} 1 \\ 0 \end{bmatrix}$$

Because the sending end adopts the single-antenna transmitting mode, the sending end does not perform precoding, so that the SNR of the receiving end is an SNR that does not contain a precoding gain. This operation lasts for a while, and after the SNR of the receiving end is stabilized, the mode of the sending end may be set as a mode needed by the test, so as to test the receiving end.

In an embodiment, the sending end may also adopt a single-antenna in-turn transmitting mode to complete the setting of the SNR. Alternatively, in an optional implementation of this embodiment, 501 may specifically include: sending the second data to the receiving end through a single-antenna in-turn transmitting mode, and the single-antenna in-turn transmitting mode includes: when the sending end is configured with n antennas, sending the second data through one antenna in the n antennas in turn, where the n is a positive integer.

For example, the sending the second data through one antenna in the n antennas in turn when the sending end is configured with n antennas may specifically include the following condition:

when the sending end is configured with n antennas, setting n orthogonal precoding matrixes having a size of n×1, where the n precoding matrixes are matrixes having only one matrix element being 1 and the other matrix elements all being 0; and in a process of precoding the second data, using the n precoding matrixes to precode the second data in turn, and sending the precoded second data.

In the case of a 2T-configured SS, the precoding matrix of the sending end may be switched in the following collections:

$$\begin{bmatrix} 1 \\ 0 \end{bmatrix} \begin{bmatrix} 0 \\ 1 \end{bmatrix}$$

Further, in the case of a 4T-configured SS, the precoding matrix of the sending end may be switched in the following collections:

$$\begin{bmatrix} 1 \\ 0 \\ 0 \\ 0 \end{bmatrix} \begin{bmatrix} 0 \\ 1 \\ 0 \\ 0 \end{bmatrix} \begin{bmatrix} 0 \\ 0 \\ 1 \\ 0 \end{bmatrix} \begin{bmatrix} 0 \\ 0 \\ 0 \\ 1 \end{bmatrix}$$

Further, in the case of an 8T-configured SS, the precoding matrix of the sending end may be switched in the following collections:

$$\begin{bmatrix}1\\0\\0\\0\\0\\0\\0\\0\end{bmatrix}\begin{bmatrix}0\\1\\0\\0\\0\\0\\0\\0\end{bmatrix}\begin{bmatrix}0\\0\\1\\0\\0\\0\\0\\0\end{bmatrix}\begin{bmatrix}0\\0\\0\\1\\0\\0\\0\\0\end{bmatrix}\begin{bmatrix}0\\0\\0\\0\\1\\0\\0\\0\end{bmatrix}\begin{bmatrix}0\\0\\0\\0\\0\\1\\0\\0\end{bmatrix}\begin{bmatrix}0\\0\\0\\0\\0\\0\\1\\0\end{bmatrix}\begin{bmatrix}0\\0\\0\\0\\0\\0\\0\\1\end{bmatrix}$$

In this embodiment, in the condition that no precoding gain exists, by sending the precoded second data to the receiving end, so that the receiving end obtains the third SNR according to the signal receiving power of the received second data and according to the second power of the received second noise signal, the SNR of the receiving end can satisfy the setting requirement, that is, the test condition that an SNR does not contain a precoding gain, so that a subsequent test is valid.

It should be noted that, for brevity, the foregoing method embodiments are represented as a series of actions. But persons skilled in the art should understand that the present invention is not limited to the order of the described actions, because according to the present invention, some steps may adopt other orders or occur simultaneously. It should be further understood by persons skilled in the art that the described embodiments all belong to exemplary embodiments, and the involved actions and modules are not necessarily needed by the present invention.

In the foregoing embodiments, the description of each of the embodiments has respective focuses. For a part that is not described in detail in a certain embodiment, reference may be made to related descriptions in other embodiments.

Figure 6:
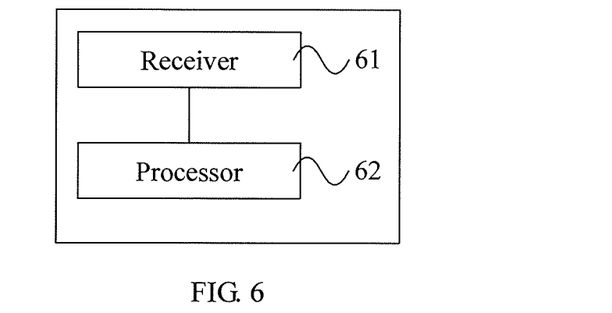
FIG. 6 is a schematic structural diagram of a signal receiving device according to another embodiment of the present invention.

FIG. 6 is a schematic structural diagram of a signal receiving device according to another embodiment of the present invention. Referring to FIG. 6, the signal receiving device of this embodiment may include a receiver 61 and a processor 62. The receiver 61 is configured to receive a first noise signal on at least one first RE and receive, on the at least one first RE, first data sent by a signal sending device, where the first data is data before precoding; and the processor 62 is configured to obtain a first SNR according to signal receiving power of the first data received on the at least one first RE by the receiver 61 and according to first power of the first noise signal received on the at least one first RE by the receiver 61.

Alternatively, in an optional implementation of this embodiment, a part of the REs of the signal sending device do not take part in scheduling, and these REs that do not take part in the scheduling may be determined by the processor 62 first. These REs are filled with irrelevant pseudo random data (that is, the first data) generated by an orthogonal frequency division multiple access (Orthogonal Frequency Division Multiple Access, OFDMA) channel noise generator (OFDMA Channel Noise Generator, OCNG), the modulation mode of the irrelevant pseudo random data is a quadrature phase shift keying (Quadrature Phase Shift Keying, QPSK) modulation mode, and the irrelevant pseudo random data does not need to be precoded.

Alternatively, in an optional implementation of this embodiment, the receiver 61 may further receive, on at least one second RE, the first data having signal transmit power adjusted, and/or receive, on the at least one second RE, the first noise signal having a signal transmit power adjusted; and correspondingly, the processor 62 may obtain a second SNR according to the following manner:

obtaining a second SNR according to a signal receiving power of the first data that has the signal transmit power adjusted and is received on the at least one second RE by the receiver 61 and according to the first power of the first noise signal received on the at least one first RE by the receiver 61; or, obtaining a second SNR according to signal receiving power of the first data that has the signal transmit power adjusted and is received by the receiver 61 on the at least one second RE and according to power of the first noise signal that has the signal transmit power adjusted and is received by the receiver 61 on the at least one second RE; or, obtaining a second SNR according to the signal receiving power of the first data received on the at least one first RE by the receiver 61 and according to power of the first noise signal that has the signal transmit power adjusted and is received on the at least one second RE by the receiver 61.

The first power may include:
receiving power of the first noise signal received on the at least one first RE by the receiver 61; or,
transmit power of the first noise signal received on the at least one first RE by the receiver 61.

The power of the first noise signal having the signal transmit power adjusted may include:
receiving power of the first noise signal received on the at least one second RE by the receiver 61; or,
transmit power of the first noise signal received on the at least one second RE by the receiver 61.

Take a downlink multi-output test scenario as an example: a precoding gain in the SNR measured by the signal receiving device (that is, the SNR of the signal receiving device) is determined by a precoding matrix selected by the signal sending device according to a precoding matrix index (Precoding Matrix Index, precoding matrix index) that is fed back by the signal receiving device and matches with channel information. To ignore this part of the gain, the signal receiving power of the data and/or the power of the noise signal may be adjusted on REs (that is, the first RE and the second RE) before precoding on the signal sending device so as to set the SNR. This operation lasts for a while, and the signal receiving device starts to be tested after the SNR of the signal receiving device is stabilized.

In this embodiment, by receiving the first noise signal on the at least one first RE and receiving the first data sent by the signal sending device on the at least one first RE through the receiver, where the first data is data before precoding, so that the processor obtains the first SNR according to the signal receiving power of the first data received on the at least one first RE and according to the first power of the first noise signal received on the at least one first RE, the first SNR can satisfy the setting requirement, that is, the test condition that an SNR does not contain a precoding gain, so that the subsequent test is valid.

Figure 7:
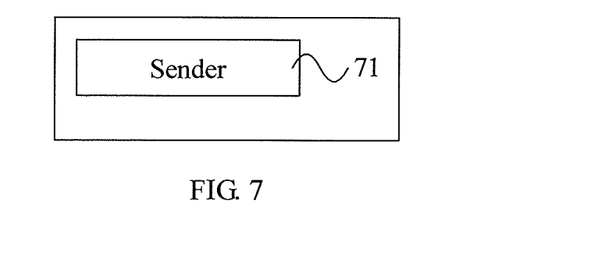
FIG. 7 is a schematic structural diagram of a signal sending device according to another embodiment of the present invention.

FIG. 7 is a schematic structural diagram of a signal sending device according to another embodiment of the present invention. Referring to FIG. 7, the signal sending device of this embodiment may include a sender 71, configured to send, on at least one first RE, first data to a signal receiving device, where the first data is data before precoding, so that the signal receiving device obtains a first SNR according to signal receiving power of the first data received on the at least one first RE and according to first power of a first noise signal received on the at least one first RE.

Alternatively, in an optional implementation of this embodiment, a part of the REs of the signal sending device do not take part in scheduling, and these REs that do not take part in the scheduling may be determined by the processor first.

These REs are filled with irrelevant pseudo random data (that is, the first data) generated by an orthogonal frequency division multiple access (Orthogonal Frequency Division Multiple Access, OFDMA) channel noise generator (OFDMA Channel Noise Generator, OCNG), the modulation mode of the irrelevant pseudo random data is a quadrature phase shift keying (Quadrature Phase Shift Keying, QPSK) modulation mode, and the irrelevant pseudo random data does not need to be precoded.

Alternatively, in an optional implementation of this embodiment, the sender 71 may further send, on at least one second RE, the first data having a signal transmit power adjusted, so that the signal receiving device obtains a second SNR according to the following manner:

obtaining a second SNR according to signal receiving power of the first data that has the signal transmit power adjusted and is received on the at least one second RE and according to the first power of the first noise signal received on the at least one first RE; or, obtaining a second SNR according to signal receiving power of the first data that has the signal transmit power adjusted and is received on the at least one second RE and according to power of the first noise signal that has signal transmit power adjusted and is received on the at least one second RE; or, obtaining a second SNR according to the signal receiving power of the first data received on the at least one first RE and according to power of the first noise signal that has signal transmit power adjusted and is received on the at least one second RE.

The first power may include:

receiving power of the first noise signal sent on the at least one first by the sender 71 RE; or, transmit power of the first noise signal sent on the at least one first by the sender 71 RE.

The power of the first noise signal having the signal transmit power adjusted may include:

receiving power of the first noise signal sent on the at least one second RE by the sender 71; or, transmit power of the first noise signal sent on the at least one second RE by the sender 71.

Take a downlink multi-output test scenario as an example: a precoding gain in the SNR measured by the signal receiving device (that is, the SNR of the signal receiving device) is determined by a precoding matrix selected by the signal sending device according to a precoding matrix index (Precoding Matrix Index, PMI) that is fed back by the signal receiving device and matches with channel information. To ignore this part of the gain, the signal receiving power of the data and/or the power of the noise signal may be adjusted on REs (that is, the first RE and the second RE) before precoding on the signal sending device so as to set the SNR. This operation lasts for a while, and the signal receiving device starts to be tested after the SNR of the signal receiving device is stabilized.

In this embodiment, by sending, on the at least one first RE, the first data to the signal receiving device through the sender, where the first data is data before precoding, so that the signal receiving device obtains the first SNR according to the signal receiving power of the first data received on the at least one first RE and according to the first power of the first noise signal received on the at least one first RE, the first SNR can satisfy the setting requirement, that is, the test condition that an SNR does not contain a precoding gain, so that a subsequent test is valid.

Figure 8:
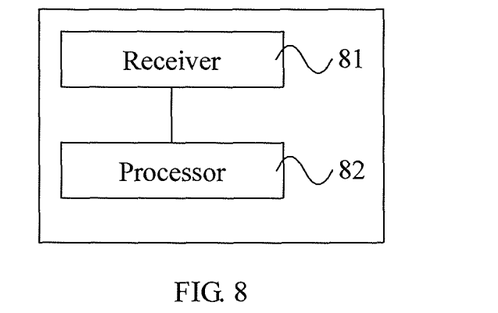
FIG. 8 is a schematic structural diagram of a signal receiving device according to another embodiment of the present invention.

FIG. 8 is a schematic structural diagram of a signal receiving device according to another embodiment of the present invention. Referring to FIG. 8, the signal receiving device of this embodiment may include a receiver 81 and a processor 82. The receiver 81 is configured to: in a condition that no precoding gain exists, receive a second noise signal and receive precoded second data sent by a signal sending device; and the processor 82 is configured to obtain a third SNR according to signal receiving power of the second data received by the receiver 81 and according to second power of the second noise signal received by the receiver 81.

It should be noted that, the precoding gain in this embodiment may include:

a gain of the signal quality of the second data received by the receiver 81 through a first receiving method relative to the signal quality of the second data received by the receiver 81 through a second receiving method, where the first receiving method includes: feeding back, by a sender of the device, a first precoding matrix index to the signal sending device in a condition that a channel changes, and receiving, by the receiver 81, the precoded second data that is sent by the signal sending device after precoding the second data according to the first precoding matrix index, and the second receiving method includes directly receiving, by the receiver 81, the second data sent by the signal sending device in a condition that a channel changes.

The second power of the second noise signal may include:

receiving power of the second noise signal; or, transmit power of the second noise signal.

Alternatively, in an optional implementation of this embodiment, the condition that no precoding gain exists may include: a condition that the precoded second data is inconsistent with the change of a channel. Take a downlink multi-output test scenario as an example: a precoding gain in the SNR measured by the signal receiving device (that is, the SNR of the signal receiving device) is determined by a precoding matrix selected by the signal sending device according to a precoding matrix index that is fed back by the signal receiving device and matches with channel information. To ignore this part of the gain, the signal sending device and the signal receiving device may be controlled to implement data transmission irrelevant to the change of the channel, that is, the precoded second data is inconsistent with the change of the channel, so as to realize the condition that no precoding gain exists. Because the signal sending device and the signal receiving device implement data transmission irrelevant to the change of the channel, for example, no precoding gain exists between the signal sending device and the signal receiving device or the precoding gain there-between is 0, the SNR of the signal receiving device is regarded as an SNR that does not contain a precoding gain. This operation lasts for a while, and after the SNR of the signal receiving device is stabilized, the mode of the signal sending device may be set as a mode needed by the test, so as to test the signal receiving device.

Alternatively, in an optional implementation of this embodiment, the receiver 81 may specifically receive the second noise signal and receive the precoded second data that is sent by the signal sending device after precoding the second data according to a randomly adopted second precoding matrix index. Because the second precoding matrix index is randomly set, the precoding matrixes corresponding to some second precoding matrix indexes may bring a forward precoding gain to a channel, and the precoding matrixes corresponding to some second precoding matrix indexes may bring a backward precoding gain to a channel. This operation lasts for a while, and all the precoding gains brought by the precoding matrixes corresponding to the first PMI to the channel are 0, so that the SNR of the signal receiving device is an SNR that does not contain a precoding gain. After the SNR of the signal receiving device is stabilized, the mode of the signal sending device may be set as a mode needed by the test, so as to test the signal receiving device.

Alternatively, in an optional implementation of this embodiment, the receiver 81 may specifically receive the second noise signal and receive the precoded second data that is sent by the signal sending device and not processed by a signal fader. Because the data between the signal sending device and the signal receiving device (that is, the precoded second data) is not transmitted through a channel, that is, because no channel is used for data transmission, the power of the signal receiving device is consistent with the power of the signal sending device, thus that the SNR of the signal receiving device is an SNR that does not contain a precoding gain. This operation lasts for a while, and after the SNR of the signal receiving device is stabilized, the mode of the signal sending device may be set as a mode needed by the test, so as to test the signal receiving device.

Alternatively, in an optional implementation of this embodiment, the receiver 81 may specifically receive the second noise signal and receive the second data that is sent by the signal sending device through a single-antenna transmitting mode. For example, an n×1 precoding matrix may be set, and the precoding matrix is a matrix having only one matrix element being 1 and the other matrix elements all being 0, where n is the number of transmitting antennas at the signal sending device. In the case of a 2T-configured SS, the precoding matrix of the signal sending device may be:

$$\begin{bmatrix}1\\0\end{bmatrix}$$

Because the signal sending device adopts the single-antenna transmitting mode, the signal sending device does not perform precoding, so that the SNR of the signal receiving device is an SNR that does not contain a precoding gain. This operation lasts for a while, and after the SNR of the signal receiving device is stabilized, the mode of the signal sending device may be set as a mode needed by the test, so as to test the signal receiving device.

In an embodiment, the signal sending device may also adopt a single-antenna in-turn transmitting mode to complete the setting of the SNR. Alternatively, in an optional implementation of this embodiment, the receiver 81 may specifically receive the second noise signal and receive the second data that is sent by the signal sending device through a single-antenna in-turn transmitting mode, and the single-antenna in-turn transmitting mode includes: when the signal sending device is configured with n antennas, sending the second data through one antenna in the n antennas in turn, where the n is a positive integer. For example, the sending the second data through one antenna in the n antennas in turn when the signal sending device is configured with n antennas may specifically include the following condition:

when the signal sending device is configured with n antennas, setting n orthogonal precoding matrixes having a size of n×1, where the n precoding matrixes are matrixes having only one matrix element being 1 and the other matrix elements all being 0; and in a process of precoding the second data, using the n precoding matrixes to precode the second data in turn, and sending the precoded second data.

In the case of a 2T-configured SS, the precoding matrix of the signal sending device may be switched in the following collections:

$$\begin{bmatrix}1\\0\end{bmatrix}\begin{bmatrix}0\\1\end{bmatrix}$$

Further, in the case of a 4T-configured SS, the precoding matrix of the signal sending device may be switched in the following collections:

$$\begin{bmatrix}1\\0\\0\\0\end{bmatrix}\begin{bmatrix}0\\1\\0\\0\end{bmatrix}\begin{bmatrix}0\\0\\1\\0\end{bmatrix}\begin{bmatrix}0\\0\\0\\1\end{bmatrix}$$

Further, in the case of an 8T-configured SS, the precoding matrix of the signal sending device may be switched in the following collections:

$$\begin{bmatrix}1\\0\\0\\0\\0\\0\\0\\0\end{bmatrix}\begin{bmatrix}0\\1\\0\\0\\0\\0\\0\\0\end{bmatrix}\begin{bmatrix}0\\0\\1\\0\\0\\0\\0\\0\end{bmatrix}\begin{bmatrix}0\\0\\0\\1\\0\\0\\0\\0\end{bmatrix}\begin{bmatrix}0\\0\\0\\0\\1\\0\\0\\0\end{bmatrix}\begin{bmatrix}0\\0\\0\\0\\0\\1\\0\\0\end{bmatrix}\begin{bmatrix}0\\0\\0\\0\\0\\0\\1\\0\end{bmatrix}\begin{bmatrix}0\\0\\0\\0\\0\\0\\0\\1\end{bmatrix}$$

In this embodiment, in the condition that no precoding gain exists, by receiving the second noise signal and receiving the precoded second data sent by the signal sending device through the receiver; and obtaining the third SNR according to the signal receiving power of the received second data and according to the second power of the received second noise signal, the SNR of the signal receiving device can satisfy the setting requirement, that is, the test condition that an SNR does not contain a precoding gain, so that a subsequent test is valid.

Figure 9:
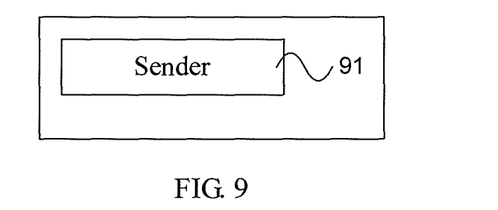
FIG. 9 is a schematic structural diagram of a signal sending device according to another embodiment of the present invention.

FIG. 9 is a schematic structural diagram of a signal sending device according to another embodiment of the present invention. Referring to FIG. 9, the signal sending device of this embodiment may include a sender 91, configured to: in a condition that no precoding gain exists, send precoded second data to a signal receiving device, so that the signal receiving device obtains a third SNR according to signal receiving power of the received second data and according to second power of a received second noise signal.

Alternatively, the second data may be precoded first to obtain the precoded second data.

It should be noted that, the precoding gain in this embodiment may include:

a gain of the signal quality of the second data received by the signal receiving device through a first receiving method relative to the signal quality of the second data received by the signal receiving device through a second receiving method, where the first receiving method includes: feeding back, by the signal receiving device, a first precoding matrix index to the signal sending device in a condition that a channel changes, and receiving the precoded second data that is sent by the signal sending device after precoding the second data according to the first precoding matrix index, and the second receiving method includes directly receiving, by the signal receiving device, the second data sent by the signal sending device in a condition that a channel changes.

The second power of the second noise signal may include:
receiving power of the second noise signal; or,
transmit power of the second noise signal.

Alternatively, in an optional implementation of this embodiment, the condition that no precoding gain exists may include: a condition that the precoded second data is inconsistent with the change of a channel. Take a downlink multi-output test scenario as an example: a precoding gain in the SNR measured by the signal receiving device (that is, the SNR of the signal receiving device) is determined by a precoding matrix selected by the signal sending device according to a precoding matrix index that is fed back by the signal receiving device and matches with channel information. To ignore this part of the gain, the signal sending device and the signal receiving device may be controlled to implement data transmission irrelevant to the change of the channel, that is, the precoded second data is inconsistent with the change of the channel, so as to realize the condition that no precoding gain exists. Because the signal sending device and the signal receiving device implement data transmission irrelevant to the change of the channel, for example, no precoding gain exists between the signal sending device and the signal receiving device or the precoding gain there-between is 0, the SNR of the signal receiving device is regarded as an SNR that does not contain a precoding gain. This operation lasts for a while, and after the SNR of the signal receiving device is stabilized, the mode of the signal sending device may be set as a mode needed by the test, so as to test the signal receiving device.

Figure 10:
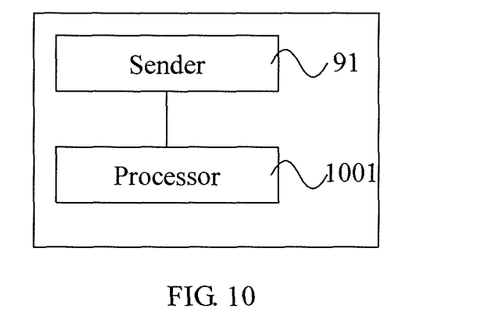
FIG. 10 is a schematic structural diagram of a signal sending device according to another embodiment of the present invention.

Alternatively, in an optional implementation of this embodiment, referring to FIG. 10, the device provided by this embodiment may further include a processor 1001, configured to precode the second data according to a randomly adopted second precoding matrix index. The sender may specifically send the precoded second data to the signal receiving device. Because the second precoding matrix index is randomly set, the precoding matrixes corresponding to some second precoding matrix indexes may bring a forward precoding gain to a channel, and the precoding matrixes corresponding to some second precoding matrix indexes may bring a backward precoding gain to a channel. This operation lasts for a while, and all the precoding gains brought by the precoding matrixes corresponding to the first PMI to the channel are 0, so that the SNR of the signal receiving device is an SNR that does not contain a precoding gain. After the SNR of the signal receiving device is stabilized, the mode of the signal sending device may be set as a mode needed by the test, so as to test the signal receiving device.

Alternatively, in an optional implementation of this embodiment, the sender 91 may specifically send the precoded second data not processed by a signal fader to the signal receiving device. Because the data between the signal sending device and the signal receiving device (that is, the precoded second data) is not transmitted through a channel, that is, because no channel is used for data transmission, the power of the signal receiving device is consistent with the power of the signal sending device, so that the SNR of the signal receiving device is an SNR that does not contain a precoding gain. This operation lasts for a while, and after the SNR of the signal receiving device is stabilized, the mode of the signal sending device may be set as a mode needed by the test, so as to test the signal receiving device.

Alternatively, in an optional implementation of this embodiment, the sender 91 may specifically send the second data to the signal receiving device through a single-antenna transmitting mode. For example, an n×1 precoding matrix may be set, and the precoding matrix is a matrix having only one matrix element being 1 and the other matrix elements all being 0, where n is the number of transmitting antennas at the signal sending device. In the case of a 2T-configured SS, the precoding matrix of the signal sending device may be:

$$\begin{bmatrix} 1 \\ 0 \end{bmatrix}$$

Because the sender 91 adopts the single-antenna transmitting mode, the signal sending device does not perform precoding, so that the SNR of the signal receiving device is an SNR that does not contain a precoding gain. This operation lasts for a while, and after the SNR of the signal receiving device is stabilized, the mode of the signal sending device may be set as a mode needed by the test, so as to test the signal receiving device.

In an embodiment, the signal sending device may also adopt a single-antenna in-turn transmitting mode to complete the setting of the SNR. Alternatively, in an optional implementation of this embodiment, the sender 91 may specifically send the second data to the signal receiving device through a single-antenna in-turn transmitting mode, and the single-antenna in-turn transmitting mode includes: when the signal sending device is configured with n antennas, sending the second data through one antenna in the n antennas in turn, where the n is a positive integer.

For example, the sending the second data through one antenna in the n antennas in turn when the signal sending device is configured with n antennas may specifically include the following condition:

when the signal sending device is configured with n antennas, setting n orthogonal precoding matrixes having a size of n×1, where the n precoding matrixes are matrixes having only one matrix element being 1 and the other matrix elements all being 0; and in a process of precoding the second data, using the n precoding matrixes to precode the second data in turn, and sending the precoded second data.

In the case of a 2T-configured SS, the precoding matrix of the signal sending device may be switched in the following collections:

$$\begin{bmatrix} 1 \\ 0 \end{bmatrix} \begin{bmatrix} 0 \\ 1 \end{bmatrix}$$

Further, in the case of a 4T-configured SS, the precoding matrix of the signal sending device may be switched in the following collections:

$$\begin{bmatrix} 1 \\ 0 \\ 0 \\ 0 \end{bmatrix} \begin{bmatrix} 0 \\ 1 \\ 0 \\ 0 \end{bmatrix} \begin{bmatrix} 0 \\ 0 \\ 1 \\ 0 \end{bmatrix} \begin{bmatrix} 0 \\ 0 \\ 0 \\ 1 \end{bmatrix}$$

Further, in the case of an 8T-configured SS, the precoding matrix of the signal sending device may be switched in the following collections:

$$\begin{bmatrix}1\\0\\0\\0\\0\\0\\0\\0\end{bmatrix}\begin{bmatrix}0\\1\\0\\0\\0\\0\\0\\0\end{bmatrix}\begin{bmatrix}0\\0\\1\\0\\0\\0\\0\\0\end{bmatrix}\begin{bmatrix}0\\0\\0\\1\\0\\0\\0\\0\end{bmatrix}\begin{bmatrix}0\\0\\0\\0\\1\\0\\0\\0\end{bmatrix}\begin{bmatrix}0\\0\\0\\0\\0\\1\\0\\0\end{bmatrix}\begin{bmatrix}0\\0\\0\\0\\0\\0\\1\\0\end{bmatrix}\begin{bmatrix}0\\0\\0\\0\\0\\0\\0\\1\end{bmatrix}$$

In this embodiment, in the condition that no precoding gain exists, by sending the precoded second data to the signal receiving device through the sender, so that the signal receiving device obtains the third SNR according to the signal receiving power of the received second data and according to the second power of the received second noise signal, the SNR of the signal receiving device can satisfy the setting requirement, that is, the test condition that an SNR does not contain a precoding gain, so that a subsequent test is valid.

Persons skilled in the art may clearly understand that, for the purpose of convenient and brief description, for a detailed working process of the system, apparatus, and unit described foregoing, reference may be made to the corresponding process in the method embodiments, and details are not be described here again.

In several embodiments provided in the present application, it should be understood that the disclosed system, apparatus, and method may be implemented in other manners. For example, the described apparatus embodiment is merely exemplary. For example, the unit division is merely logical function division and may be other divisions in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical or other forms.

The units described as separate parts may or may not be physically separate, and parts displayed as units may or may not be physical units, may be located in one position, or may be distributed on a plurality of network units. A part or all of the units may be selected according to an actual need to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may also be implemented in a form of hardware plus a software functional module.

The integrated unit implemented in the form of a software functional unit may be stored in a computer readable storage medium. The software functional unit is stored in a storage medium, and includes several instructions used to instruct computer equipment (for example, a personal computer, a server, or a network equipment) to perform the steps of the methods according to the embodiments of the present invention. The storage medium includes: any medium that may store program codes, such as a USB flash disk, a removable hard disk, a read-only memory (ROM, Read-Only Memory), a random access memory (RAM, Random Access Memory), a magnetic disk, or an optical disk.

Finally, it should be noted that the foregoing embodiments are merely intended for describing the technical solutions of the present invention other than limiting the present invention. Although the present invention is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present invention.

What is claimed is:

1. A method for acquiring a signal to noise ratio, the method comprising:
receiving a first noise signal on at least one first resource element and receiving, on the at least one first resource element, first data sent by a sending end, wherein the first data is data before precoding;
obtaining a first signal to noise ratio according to signal receiving power of the first data received on the at least one first resource element and according to first power of the first noise signal received on the at least one first resource element; and
receiving, on at least one second resource element, the first data having signal transmit power adjusted, and/or receiving, on the at least one second resource element, the first noise signal having signal transmit power adjusted, and obtaining a second signal to noise ratio according to the following manner:
obtaining a second signal to noise ratio according to signal receiving power of the first data that has the signal transmit power adjusted and is received on the at least one second resource element and according to the first power of the first noise signal received on the at least one first resource element; or
obtaining a second signal to noise ratio according to signal receiving power of the first data that has the signal transmit power adjusted and is received on the at least one second resource element and according to power of the first noise signal that has the signal transmit power adjusted and is received on the at least one second resource element; or
obtaining a second signal to noise ratio according to the signal receiving power of the first data received on the at least one first resource element and according to power of the first noise signal that has the signal transmit power adjusted and is received on the at least one second resource element.

2. The method according to claim 1, wherein the first power comprises:
receive power of the first noise signal received on the at least one first resource element; or
transmit power of the first noise signal received on the at least one first resource element.

3. The method according to claim 1, wherein power of the first noise signal having the signal transmit power adjusted comprises:
receive power of the first noise signal received on the at least one second resource element; or
transmit power of the first noise signal received on the at least one second resource element.

4. A method for acquiring a signal to noise ratio, the method comprising:
sending, on at least one first resource element, first data to a receiving end, wherein the first data is data before precoding, so that the receiving end obtains a first signal to noise ratio according to signal receiving power of the first data received on the at least one first resource element and according to first power of a first noise signal received on the at least one first resource element; and sending, on at least one second resource element, the first data having a signal transmit power adjusted, so that the receiving end obtains a second signal to noise ratio according to the following manner:

obtaining a second signal to noise ratio according to signal receiving power of the first data that has the signal transmit power adjusted and is received on the at least one second resource element and according to the first power of the first noise signal received on the at least one first resource element; or obtaining a second signal to noise ratio according to signal receiving power of the first data that has the signal transmit power adjusted and is received on the at least one second resource element and according to power of the first noise signal that has signal transmit power adjusted and is received on the at least one second resource element; or obtaining a second signal to noise ratio according to the signal receiving power of the first data received on the at least one first resource element and according to power of the first noise signal that has signal transmit power adjusted and is received on the at least one second resource element.

5. The method according to claim 4, wherein the first power comprises:

receive power of the first noise signal sent on the at least one first resource element; or transmit power of the first noise signal sent on the at least one first resource element.

6. The method according to claim 4, wherein power of the first noise signal having the signal transmit power adjusted comprises:

receive power of the first noise signal sent on the at least one second resource element; or transmit power of the first noise signal sent on the at least one second resource element.

7. A signal receiving device, comprising:

a receiver, configured to receive a first noise signal on at least one first resource element and receive, on the at least one first resource element, first data sent by a signal sending device, wherein the first data is data before precoding;

a processor, configured to obtain a first signal to noise ratio according to signal receiving power of the first data received on the at least one first resource element by the receiver and according to first power of the first noise signal received on the at least one first resource element by the receiver;

wherein the receiver is further configured to receive, on at least one second resource element, the first data having signal transmit power adjusted, and/or receive, on the at least one second resource element, the first noise signal having a signal transmit power adjusted; and wherein the processor is further configured to obtain a second signal to noise ratio according to the following manner:

obtain a second signal to noise ratio according to signal receiving power of the first data that has the signal transmit power adjusted and is received on the at least one second resource element by the receiver and according to the first power of the first noise signal received on the at least one first resource element by the receiver; or obtain a second signal to noise ratio according to signal receiving power of the first data that has the signal transmit power adjusted and is received on the at least one second resource element by the receiver and according to power of the first noise signal that has the signal transmit power adjusted and is received on the at least one second resource element by the receiver; or obtain a second signal to noise ratio according to the signal receiving power of the first data received on the at least one first resource element by the receiver and according to power of the first noise signal that has the signal transmit power adjusted and is received on the at least one second resource element by the receiver.

8. The device according to claim 7, wherein the first power comprises:

receive power of the first noise signal received on the at least one first resource element by the receiver; or transmit power of the first noise signal received on the at least one first resource element by the receiver.

9. The device according to claim 7, wherein power of the first noise signal having the signal transmit power adjusted comprises:

receive power of the first noise signal received on the at least one second resource element by the receiver; or transmit power of the first noise signal received on the at least one second resource element by the receiver.

10. A signal sending device, comprising:

a sender, configured to:

send, on at least one first resource element, first data to a signal receiving device, wherein the first data is data before precoding, so that the signal receiving device obtains a first signal to noise ratio according to signal receiving power of the first data received on the at least one first resource element and according to first power of a first noise signal received on the at least one first resource element; and send, on at least one second resource element, the first data having signal transmit power adjusted, so that the signal receiving device obtains a second signal to noise ratio according to the following manner:

obtain a second signal to noise ratio according to signal receiving power of the first data that has the signal transmit power adjusted and is received on the at least one second resource element and according to the first power of the first noise signal received on the at least one first resource element; or obtain a second signal to noise ratio according to signal receiving power of the first data that has the signal transmit power adjusted and is received on the at least one second resource element and according to power of the first noise signal that has a signal transmit power adjusted and is received on the at least one second resource element; or obtain a second signal to noise ratio according to the signal receiving power of the first data received on the at least one first resource element and according to power of the first noise signal that has signal transmit power adjusted and is received on the at least one second resource element.

11. The device according to claim 10, wherein the first power comprises:

receive power of the first noise signal sent on the at least one first resource element by the sender; or transmit power of the first noise signal sent on the at least one first resource element by the sender.

12. The device according to claim 10, wherein power of the first noise signal having the signal transmit power adjusted comprises:
  receive power of the first noise signal sent on the at least one second resource element by the sender; or
  transmit power of the first noise signal sent on the at least one second resource element by the sender.

* * * * *